United States Patent

Yates, III et al.

[11] Patent Number: 5,115,043
[45] Date of Patent: May 19, 1992

[54] PROCESS FOR FUNCTIONALIZING POLYPHENYLENE ETHER WITH SUBSTITUTED CHLOROTRIAZINE

[75] Inventors: John B. Yates, III, Glenmont; Sterling B. Brown, Schenectady, both of N.Y.; Richard C. Lowry, Phoenixville, Pa.; James C. Blubaugh, Albany; David F. Aycock, Glenmont, both of N.Y.

[73] Assignee: General Electric Company, Schenectady, N.Y.

[21] Appl. No.: 659,659

[22] Filed: Feb. 25, 1991

[51] Int. Cl.$^5$ .............................................. C08G 65/48
[52] U.S. Cl. ....................................... 525/390; 525/396
[58] Field of Search ................................. 525/390, 396

[56] References Cited

U.S. PATENT DOCUMENTS

| | | | |
|---|---|---|---|
| 4,895,945 | 1/1990 | Brown et al. | 544/218 |
| 4,927,894 | 5/1990 | Brown | 525/390 |
| 5,001,201 | 3/1991 | Brown | 525/390 |
| 5,041,504 | 8/1991 | Brown et al. | |

OTHER PUBLICATIONS

D. M. White and G. R. Loucks, "Coupling and Capping Reactions on Poly(2,6-Dimethyl-1,4-Phenylene Oxide", Reactive Oligomers, 1985 American Chemical Society, pp. 187-197.

*Primary Examiner*—Harold D. Anderson
*Attorney, Agent, or Firm*—William H. Pittman; James C. Davis, Jr.

[57] ABSTRACT

A method for the production of functionalized polyphenylene ether by contacting crude polyphenylene ether with an aqueous base and subsequently adding substituted chlorotriazine such as butyl glycidyl chlorocyanurate or mesityl glycidyl chlorocyanurate.

20 Claims, No Drawings

PROCESS FOR FUNCTIONALIZING POLYPHENYLENE ETHER WITH SUBSTITUTED CHLOROTRIAZINE

TECHNICAL FIELD

This invention is directed to the preparation of polyphenylene ethers containing reactive functional groups and more particularly to the functionalization of polyphenylene ethers with substituted chlorotriazines.

BACKGROUND OF THE INVENTION

Methods for preparing functionalized polyphenylene ether compositions are known in the art. A process which may be used for making a functionalized polyphenylene ether includes dissolving polyphenylene ether powder in toluene and contacting it, for example, with an epoxychlorotriazine such as mesityl glycidyl chlorocyanurate, a phase transfer catalyst, and an aqueous base, and then precipitating it with methanol. However, the above mentioned process is economically less favorable than functionalizing a crude polyphenylene ether process stream.

Polyphenylene ether has been epoxy functionalized through contact with an epoxy chlorotriazine in the presence of a basic reagent under reactive conditions. However, the polyphenylene ether as well as secondary and tertiary amines present in the process stream compete for the chlorotriazine. Therefore, a large stoichiometric excess of chlorotriazine is required, rendering this method of functionalizing polyphenylene ether not optimally efficient.

The present invention provides a method for more efficiently introducing functionality into polyphenylene ethers. The method of the present invention allows a substantial reduction of capping agent necessary to functionalize polyphenylene ether while producing products that are highly reactive and readily convertible under both solution and melt conditions to copolymers of polyphenylene ethers with a wide variety of strongly and weakly nucleophilic polymers, notably polyamides and polyesters such as polybutylene terephthalate. Blends which contain such copolymers have increased ductility and impact strength, particularly when blended with conventional impact modifiers for polyphenylene ethers.

In one of its aspects, the present invention provides a process for capping polyphenylene ether with chlorotriazine in the presence of nucleophilic species which compete with the polyphenylene ether for the capping agent, without using a large excess of capping agent. The preparation of a substituted triazine-capped polyphenylene ether composition includes the following sequential steps:

(a) contacting under reactive conditions at least one polyphenylene ether with an aqueous basic reagent; and (b) contacting under reactive conditions a composition resulting from step (a) with substituted chlorotriazine.

In a further embodiment the present invention provides a process for capping polyphenylene ether with chlorotriazine by neutralizing a composition resulting from step (b) with gaseous carbon dioxide.

DETAILED DESCRIPTION OF THE INVENTION

The present invention provides a more efficient method of producing capped polyphenylene ether compositions comprising polymer molecules having end groups of the following formula

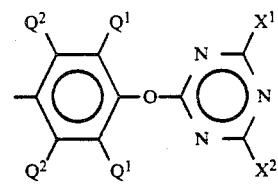

wherein:

each $Q^1$ is independently halogen, primary or secondary lower alkyl (i.e., alkyl containing up to 7 carbon atoms) phenyl, haloalkyl, aminoalkyl, hydrocarbonoxy or halohydrocarbonoxy wherein at least two carbon atoms separate the halogen and oxygen atoms, each $Q^2$ is independently hydrogen, halogen, primary or secondary lower alkyl, phenyl, haloalkyl, hydrocarbonoxy or halohydrocarbonoxy as defined for $Q^1$, $X^1$ and $X^2$ are independently a substituted or unsubstituted oxyalkyl, oxyaryl, or alkyl-substituted oxyaryl group. Suitable values for $X^1$ and $X^2$ include an epoxy substituted oxyalkyl (i.e. alkoxy), a halo- or phosphate-substituted oxyalkyl group, or a cyclic orthoeste-resubstituted oxyalkyl group; and more suitably oxyethyldiethyl phosphate, oxyethyl di-n-butyl phosphate, 4-oxymethyl-2- methoxy-2-methyl-1,3-dioxolane or

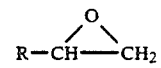

wherein R is an oxy substituted divalent aliphatic, alicyclic, heterocyclic or substituted or unsubstituted aromatic hydrocarbon radical; and preferably 2,3-epoxyoxy-propyl.

The above mentioned substituted chlorotriazine capped polyphenylene ether compositions are produced by a method that includes the sequential steps of (a) contacting under reactive conditions at least one polyphenylene ether with an aqueous base and (b) contacting under reactive conditions the composition resulting from step (a) with substituted chlorotriazine of the following formula

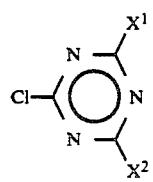

The polyphenylene ethers used in the present invention comprise a plurality of structural units having the formula

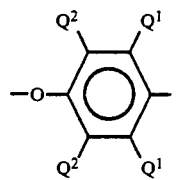
(IV)

wherein:
each $Q^1$ and $Q^2$ is as defined above. Suitable primary lower alkyl groups include methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl, and 3-pentyl. Preferably, any alkyl radicals are straight chain, rather than branched. Most often, each $Q^1$ is alkyl or phenyl, especially $C_{1-4}$ alkyl and each $Q^2$ is hydrogen.

Both homopolymer and copolymer polyphenylene ethers are included. Suitable homopolymers are those containing 2,6-dimethyl-1,4-phenylene ether units. Suitable copolymers include random copolymers containing such units in combination with (for example) 2,3,6-trimethyl-1,4-phenylene ether units.

Also included are polyphenylene ethers containing moieties which modify properties such as molecular weight, melt viscosity and/or impact strength. Such polymers may be prepared by grafting onto the polyphenylene ether such vinyl monomers as acrylonitrile and vinylaromatic compounds (e.g., styrene), or such polymers as polystyrenes and elastomers. Other suitable polymers are the coupled polyphenylene ethers in which the coupling agent is reacted with the hydroxy groups of two polyphenylene ether chains to produce a higher molecular weight polymer containing the reaction product of the hydroxy groups and the coupling agent, provided a substantial proportion of free hydroxy groups remain present. Illustrative coupling agents are low molecular weight polycarbonates, quinones and heterocycles.

The polyphenylene ether generally has a number average molecular weight within the range of about 3,000 to 40,000 and a weight average molecular weight within the range of 20,000-80,000 as determined by gel permeation chromatography. Its intrinsic viscosity is most often in the range of about 0.15 dl./g. to about 0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6xylenol (wherein each $Q^1$ is methyl and each $Q^2$ is hydrogen), whereupon the polymer may be characterized as a poly(2,6-dimethyl-1,4-phenylene ether) and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and U.S. Pat. No. 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, hydroxyoximes (monomeric and polymeric), α-hydroxyaryl oximes and α-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

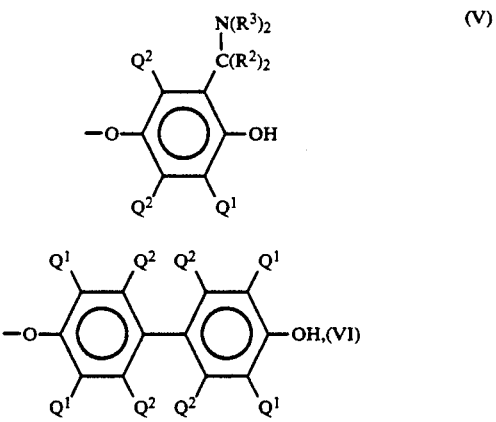

wherein $Q^1$ and $Q^2$ are as previously defined; each $R^2$ is independently hydrogen or alkyl with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula V may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the hydrogen atoms on one or more $Q^1$ radicals The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

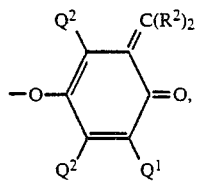

(VII)

with numerous beneficial effects often including an increase in impact strength and compatibilization with other blend components. Reference is made to U.S. Pat. Nos. 4,054,553, 4,092,294, 4,477,649, 4,477,651 and U.S. Pat. No. 4,517,341, the disclosures of which are incorporated by reference herein.

Polymers with 4-hydroxybiphenyl end groups of formula VI are typically obtained from reaction mixtures in which a by-product diphenoquinone of the formula

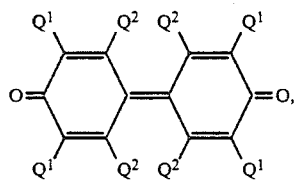

(VIII)

is present, especially in a copper-halide-secondary or tertiary amine system. In this regard, the disclosure of U.S. Pat. No. 4,477,649 is again pertinent as are those of U.S. Pat. No. 4,234,706 and U.S. Pat. No. 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas V and VI. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units of ancillary chemical features.

Polyphenylene ether process streams provide a continuous process for the preparation of polyphenylene ethers. High levels of both secondary and tertiary amines such as those disclosed in U.S. Pat. No. 4,675,377 are present in polyphenylene ether process streams.

Typical epoxy chlorotriazines include 2-chloro-4,6-diglycidoxy-1,3,5-triazine, 2-chloro-4-(n-butoxy)-6-glycidoxy-1,3,5-triazine and 2-chloro-4-(2,4,6-°-trimethylphenoxy)-6-glycidoxy-1,3,5-triazine. These compounds may also be named as though derived from cyanuric acid and designated diglycidyl chlorocyanurate, n-butyl glycidyl chlorocyanurate and 2,4,6-trimethylphenyl glycidyl chlorocyanurate and hereinafter identified as "DGCC", "BGCC" and "MGCC" respectively. They may be prepared, for example, by the reaction of 2,4,6-trichlorotriazine (cyanuric chloride) with glycidol or combinations thereof with nbutanol or mesitol. Cyanuric chloride and n-butyl dichlorocyanurate are both commercially available. Intermediates such as DGCC, BGCC, and MGCC and the method for their preparation are disclosed in commonly owned U.S. Pat. No. 4,895,945, which is incorporated by reference herein.

Typical phosphatetriazines include 2-chloro-4(2-diethylphosphatoethoxy)-6-(2,4,6-trimethylphenoxy)-1,3,5triazine, 2-chloro-4-(2-dibutylphosphatoethoxy)-6-(2,4,6-trimethylphenoxy)-1,3,5-triazine, and 2-chloro-4-(2-dibutylphosphatoethoxy)-6-(2,6-dimethylphenoxy)-1,3,5traizine. Such intermediates and the method for their preparation are disclosed in copending, commonly owned application Ser. No. 07/534,622, filed June 7, 1990, which is incorporated by reference herein. Typical orthoestertriazines include 2-chloro-4-(2-methoxy-2-methyl-1,3-dioxolanyl)methoxy-6-phenoxy-1,3,5-triazine. Such intermediates and the method for their preparation are disclosed in copending, commonly owned application Ser. No. 07/567,574, filed Aug. 15, 1990, which is incorporated by reference herein. The amount of substituted chlorotriazine present is about 0.2 to 5 molar equivalents and preferably about 0.5 to 2.5 molar equivalents based on the amount of free or non-hydrogen bonded hydroxy groups present on polyphenylene ether as determined by Fourier transform infrared spectroscopy.

The aqueous basic reagent is an alkali metal base, preferably having a pH ranging from about 8 to about 14. The aqueous base is more preferably selected from the group including sodium hydroxide, potassium hydroxide, and quaternary ammonium hydroxide. A suitable amount of basic reagent is about 0.2–2.0 molar equivalents based on the amount of free or non-hydrogen bonded hydroxy groups present on polyphenylene ether as determined by Fourier transform infrared spectroscopy.

The reactive conditions are as follows. The polyphenylene ether is contacted with the aqueous base in the presence of a non-solar organic liquid, preferably toluene. The polyphenylene ether is contacted with the aqueous base for at least about 10 seconds. The reaction occurs at temperatures which range from about ambient temperature to 90° C. A phase transfer catalyst is present, preferably a quaternary ammonium salt capable of acting as a phase transfer catalyst. Those skilled in the art will know suitable quaternary ammonium salts. Preferably the quaternary ammonium salt is a tetraalkyl ammonium halide or hydrogen sulfate with at least carbon atoms and the halide is bromide or chloride, preferably bromide. The amount of phase transfer catalyst used is suitably about 0.1% to about 10% by weight based on the polyphenylene ether present, preferably about 0.1% to about 5.0% by weight based on polyphenylene ether present and more preferably about 0.5% to about 1.5% by weight based on the polyphenylene ether present.

The triazine functionalization of polyphenylene ether compositions is further enhanced by the addition of water before the addition of the substituted chlorotriazine, as well as by neutralizing any base remaining in the capping reaction with gaseous carbon dioxide before precipitation. Suitable amounts of water to be added are about 0.05% to about 50%, and preferably 0.05 to 20%, by weight based on the polyphenylene ether and toluene present, generally about 2 to about 15 weight percent based on polyphenylene ether and toluene present and preferably about 6% to about 12% by weight based on the polyphenylene ether and toluene present.

In order that those skilled in the art may be better able to practice the present invention, the following examples are given as illustrations of the increased capping levels of polyphenylene ether exhibited when employing the method of the present invention, and also as illustrations of superior impact strength resulting in blends including polyphenylene ether having increased capping levels. It should be noted that the invention is not limited to the specific details embodied in the examples.

EXAMPLE 1

To a mechanically stirred 0.40 IV polyphenylene ether process stream containing about 0.1 weight percent free hydroxy groups, about 34% to about 39% solids, about 0.40% by weight dimethylbutyl amine and about 0.25% by weight dibutyl amine as a slurry in toluene, at 90° C. under nitrogen, a solution of 10% methyl trialkyl $C_{(8-10)}$ ammonium chloride in toluene (1.2 weight percent based on polyphenylene ether present) was added. Then 1.36 mol. equivalents NaOH (based on the polyphenylene ether free hydroxy end group concentration) were added as a 10% aqueous solution and the mixture was stirred for 15 minutes. Then 2.6 molar equivalents MGCC (based on the polyphenylene ether free hydroxy end group concentration) were added and stirring of the mixture continued for another 30 minutes. The reaction mixture was precipitated by treatment with methanol in a blender, filtered, washed with methanol and dried in a vacuum oven at 110° C.

EXAMPLES 2-3

Examples 2 and 3 were prepared in a manner similar to Example 1 except that 2.1 molar equivalents MGCC (based on the amount of free hydroxy groups present on polyphenylene ether), and 1.59 molar equivalents MGCC (based on the amount of free hydroxy groups present on polyphenylene ether) were added, respectively.

EXAMPLE 4

Example 4 was prepared in a manner similar to Example 1 except that 2.6 molar equivalents MGCC (based on the amount of free hydroxy groups present on polyphenylene ether) were first added to the solution of polyphenylene ether process stream and methyl trialkyl $C_{(8-10)}$ ammonium chloride in toluene and stirred for 15 minutes. Then 1.36 mol. equivalents NaOH (based on the polyphenylene ether free hydroxy end group concentration) were added and stirring of the mixture continued for another 30 minutes. The reaction mixture was then, as in Example 1, precipitated by treatment with methanol in a blender, filtered, washed with methanol and dried in a vacuum oven at 110° C.

EXAMPLES 5-6

Examples 5 and 6 were prepared in a manner similar to Example 4 except that 2.1 molar equivalents MGCC (based on the amount of free hydroxy groups present on polyphenylene ether) and 1.59 molar equivalents MGCC (based on the amount of free hydroxy groups present on polyphenylene ether) were added, respectively.

Blends containing 36 parts of the epoxy functionalized polyphenylene ethers of Examples 1 through 6, 54 parts polybutylene terephthalate, commercially available from General Electric Company as Valox 315 and 10 parts of a commercially available triblock copolymer with polystyrene end blocks having weight average molecular weights of 29,000 and a hydrogenated butadiene midblock having a weight average molecular weight of 116,000, as impact modifier (hereinafter referred to as "impact modifier"), from Shell Chemicals, were prepared by extrusion on a Welding Engineers 20 mm. counter-rotating, non-intermeshing twin-screw extruder at 400 rpm. and barrel segment set temperatures of 250 (throat), 375, 510, 510, 510 and 510° F. Extrudates were quenched in water, pelletized, and dried in a circulating air oven at 100-110° C. before molding on a Boy 15-ton molder at barrel set temperatures of 280° C., mold temperature 80° C., and mold cycle time 13 seconds. Notched Izod impact values were determined as per ASTM #D256.

TABLE I

| | Mol. Equiv. MGCC added | FTIR OH | Blend N.I. | NMR Epoxide |
|---|---|---|---|---|
| NaOH added first | | | | |
| Example 1 | 2.6 | .024 | 15.3 | — |
| Example 2 | 2.1 | .026 | 15.2 | 0.85 |
| Example 3 | 1.59 | .034 | 4.3 | 0.65 |
| MGCC Added first | | | | |
| Example 4 | 2.6 | .062 | 1.1 | 0.5 |
| Example 5 | 2.1 | .074 | Brittle | 0$^a$ |
| Example 6 | 1.59 | .077 | Brittle | 0$^a$ |

$^a$Too low to measure accurately.

Table 1 shows the polyphenylene ether capping levels as measured by Fourier transform infrared (FTIR) determination of wt.% residual free (non-hydrogen bonded) hydroxy groups for Examples 1 through 6, as well as the notched Izod impact strength (in ft.-lb./in.) of blends of functionalized polyphenylene ether, polybutylene terephthalate and impact modifier. Table 1 also shows the epoxide levels for Examples 1 through 6 as measured in wt.% epoxy triazine by proton nuclear magnetic resonance spectroscopy. The FTIR data show that substantially higher levels of capping are obtained by adding NaOH first to the polyphenylene ether process stream as compared to adding first comparable levels of MGCC. The notched Izod impact strength of the epoxy functionalized polyphenylene ether/polybutylene terephthalate/impact modifier blends corresponds to the polyphenylene ether capping levels as measured by FTIR. The greater the capping level, the higher the impact strength as measured by the notched Izod test. The NMR data show higher epoxide levels corresponding to lower weight percent of residual free hydroxy groups measured by FTIR.

EXAMPLES 7-14

Examples 7-14 were prepared in a manner similar to Example 1 except that water was added to the reaction solution either at a level of 6 weight percent or 12 weight percent based on total weight of the polyphenylene ether and toluene present as shown in Table II below. Methyl trialkyl $C_{(8-10)}$ ammonium chloride phase transfer catalyst was added to the reaction mixture either at the level of 0.1 weight percent or 1.0 weight percent based on the polyphenylene ether present as shown in Table II. The reaction mixture stirring rate was either 120 or 300 rpm. There was added to the reaction mixture 0.5 weight percent dimethylbutylamine (based on polyphenylene ether present) and 1.2 equivalents NaOH (as 50% aqueous solution; equivalents based on polyphenylene ether free hydroxy end groups) followed by stirring for 45 minutes. There was added 1.85 molar equivalents MGCC (based on the amount of free hydroxy groups present on polyphenylene ether) as a 1 M toluene solution and stirring was continued for 60 minutes.

An aliquot was taken from the reaction mixture and neutralized with gaseous carbon dioxide; the capping level associated with this aliquot appears in Table II under "Neutralized NMR".

The reaction mixture was precipitated, without neutralizing with carbon dioxide, by treatment with methanol; the capping level associated with this final product appears in Table II under "Unneutralized NMR":

TABLE II

| Example | Stir Rate | Water Level | Phase Transfer Catalyst Level | Neutralized Epoxide NMR (aliquot) | Unneutralized Epoxide NMR (final product) |
|---|---|---|---|---|---|
| 7 | 300 | 6% | 0.1 wt. % | 1.16 | 1.04 |
| 8 | 300 | 6 | 1.0 | 1.35 | 1.14 |
| 9 | 300 | 12 | 0.1 | 1.06 | 0.99 |
| 10 | 300 | 12 | 1.0 | 1.35 | 1.19 |
| 11 | 120 | 6 | 0.1 | 0.94 | 0.73 |
| 12 | 120 | 6 | 1.0 | 1.07 | 1.00 |
| 13 | 120 | 12 | 0.1 | 1.05 | 1.02 |
| 14 | 120 | 12 | 1.0 | 1.27 | 1.17 |

Table II demonstrates that the unneutralized final products showed consistently lower capping levels than did the corresponding neutralized aliquots, thus illustrating the advantage of neutralizing any base remaining in the capping reaction with gaseous carbon dioxide before precipitation. Table II further shows that although generally higher capping levels were obtained at higher stirring levels, the combination of low stirring rate with high water level gave capping about equal to that obtained using high stirring rate and high water levels. Table II further shows that in each pair of examples where water level is constant higher capping is obtained at higher catalyst level.

Obviously, other modifications and variations of the present inventions are possible in light of the above teachings. It is therefore to be understood that changes may be made in particular embodiments of the invention described which are within the full intended scope of the invention as defined by the claims.

What is claimed is:

1. A method of preparing a substituted triazine-capped polyphenylene ether composition comprising polymer molecules having end groups of the formula

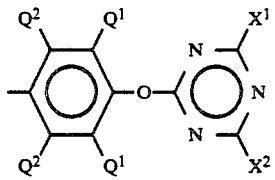

comprising sequential steps of:
(a) contacting under reactive conditions at least one polyphenylene ether with an aqueous basic reagent; and
(b) contacting under reactive conditions a composition resulting from step (a) with substituted chlorotriazine of the formula

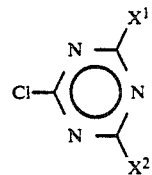

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms;

each $Q^2$ is independently hydrogen, halogen, primary or secondary lower alkyl, phenyl, haloalkyl, hydrocarbonoxy or halohydrocarbonoxy as defined for $Q^1$;

$X^1$ and $X^2$ are independently a substituted or unsubstituted oxyalkyl, alkyl-substituted oxyaryl, or an oxyaryl group.

2. The method of claim 1 wherein $X^1$ is an epoxy substituted oxyalkyl group, halo- or phosphate-substituted oxyalkyl group or a cyclic orthoester-substituted oxyalkyl group.

3. The method of claim 1 wherein $X^1$ is oxyethyldiethyl phosphate, oxyethyl di-n-butyl phosphate, 4-oxymethyl-2-methoxy-2-methyl-1,3-dioxolane or

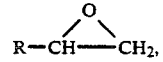

wherein R is an oxy substituted divalent aliphatic, alicyclic, heterocyclic or substituted or unsubstituted aromatic hydrocarbon radical.

4. The method of claim 1 wherein $X^1$ is 2,3-epoxy-1-oxypropyl.

5. The method of claim 1 wherein the polyphenylene ether is poly(2,6-dimethyl-1,4-phenylene ether).

6. The method of claim 1 wherein the substituted chlorotriazine is 2-chloro-4-(2,4,6-trimethylphenoxy)-6-glycidoxy-1,3,5-triazine.

7. The method of claim 1 wherein the substituted chlorotriazine is 2-chloro-4-(2-dibutylphosphatoethoxy)-6-(2,6-dimethylphenoxy)-1,3,5-triazine.

8. The method of claim 1 wherein the polyphenylene ether in the presence of a non-polar organic liquid is contacted with an aqueous basic reagent.

9. The method of claim 1 wherein the organic liquid is toluene.

10. The method of claim 1 wherein the aqueous basic reagent has a pH ranging from about 8 to about 14.

11. The method of claim 1 wherein the aqueous basic reagent is an alkali metal base.

12. The method of claim 1 wherein the aqueous base is selected from the group consisting of sodium hydroxide, potassium hydroxide and quaternary ammonium hydroxide.

13. The method of claim 1 wherein the reaction temperature is between about ambient temperature and about 90° C.

14. The method of claim 1 wherein the polyphenylene ether is contacted with the aqueous base for at least about 10 seconds.

15. The method of claim 1 wherein a phase transfer catalyst comprising a quaternary ammonium salt is employed.

16. The method of claim 1 wherein the amount of substituted chlorotriazine is at least about 0.2 molar equivalents to about 5 molar equivalents based on the amount of non-hydrogen bonded hydroxy groups present on the polyphenylene ether, the amount of basic reagent is about 0.2 molar equivalents to about 2.0 molar equivalents based on the amount of non-hydrogen bonded hydroxy groups present on the polyphenylene ether, and the amount of phase transfer catalyst is about 0.01 molar equivalents to about 1.0 molar equivalents based on the amount of non-hydrogen bonded hydroxy groups present on the polyphenylene ether.

17. The method of claim 10 wherein the amount of phase transfer catalyst is about 0.01 molar equivalents to about 1.0 molar equivalents based on the amount of non-hydrogen bonded hydroxy groups present on the polyphenylene ether.

18. A method according to claim 8 further comprising the sequential steps of:
   (a) contacting under reactive conditions at least one polyphenylene ether with an aqueous basic reagent in the presence of a phase transfer catalyst;
   (b) contacting a composition resulting from step (a) with about 0.05 to about 50 percent by weight water based on polyphenylene ether and organic liquid and
   (c) contacting under reactive conditions a composition resulting from step (b) with a substituted chlorotriazine of the formula

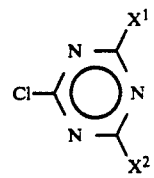

19. A method according to claim 1 further comprising neutralizing a composition resulting from step (c) with gaseous carbon dioxide.

20. A method according to claim 18 further comprising neutralizing a composition resulting from step (c) with gaseous carbon dioxide.

* * * * *